United States Patent Office 3,325,353
Patented June 13, 1967

3,325,353
GASTROPODICIDALLY EFFECTIVE 2′,5-DI-CHLORO-4′-CYANOSALICYLANILIDES
Jack D. Early, Bethesda, Md., and John P. Chupp, Kirkwood, Mo., assignors to Monsanto Company, St. Louis, Mo., a corporation of Delaware
No Drawing. Filed Mar. 22, 1966, Ser. No. 536,258
9 Claims. (Cl. 167—30)

This invention relates to new and useful 2′,5-dichloro-4′-cyanosalicylanilides and to the pesticidal use thereof.

The compounds of this invention can be represented by the formula

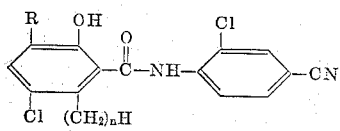

wherein $n$ is an integer from 0 to 1, and wherein R is hydrogen or alkyl having from 1 to 6 carbon atoms, for example methyl, ethyl, propyl, butyl, amyl, hexyl, and the various isomeric forms thereof.

These compounds are prepared by reacting substantially one mole of 2-chloro-4-cyanoaniline with substantially one mole of a 5-chlorosalicyclic acid of the formula

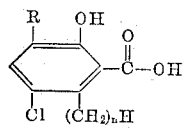

wherein $n$ and R have the aforedescribed significance in the presence of from about 0.33 to about 1.0 mole of phosphorus trichloride and an inert organic liquid (e.g. benzene, toluene, xylene, chlorobenzene, dichlorobenzene, chlorotoluene, trichlorobenzene, and the like, and mixtures thereof) at a temperature above the freezing point of the reaction system up to and including the system's boiling point, however, in general the reaction temperature will be in the range of from about 60° C. to about 200° C. These 2′,5-dichloro-4′-cyanosalicylanilide end products are solids and are insoluble in water.

As illustrative of the compounds of this invention and their preparation but not limitative thereof is the following:

Example I

To a suitable reaction vessel equipped with a thermometer, agitator and reflux condenser is charged 1.5 parts by weight of 2-chloro-4-cyanoaniline, 2.2 parts by weight of 3-tert.butyl-5-chlorosalicyclic acid (M.P. 220–222° C.) and approximately 44 parts by weight of chlorobenzene. The so charged mass is heated with agitation to about 65° C. and thereto is added 0.45 part by weight of phosphorus trichloride in approximately 25 parts by weight of chlorobenzene. The reaction mass is then heated to its boiling point and then refluxed for 9 hours. The resultant mass is then cooled and stripped of volatiles under vacuum. The residual solid mass is then washed with dilute aqueous sodium bicarbonate solution and the so washed solid recrystallized from an ethanol-water mixture. The resultant solid is 3-tert.butyl-2′,5-dichloro-4′-cyanosalicylanilide, M.P. 210–211.5° C.

Example II

Employing the procedure of Example I but replacing 3-tert.butyl-5-chlorosalicyclic acid with an equimolecular amount of 5-chlorosalicyclic acid there is obtained 2′,5-dichloro-4′-cyanosalicylanilide, M.P. 265.5–268.5° C.

Example III

Employing the procedure of Example I but replacing 3-tert.-butyl-5-chlorosalicyclic acid with an equimolecular amount of 3-isoamyl-5-chlorosalicyclic acid there is obtained 3-isoamyl-2′,5-dichloro-4′-cyanosalicylanilide, a solid.

Example IV

Employing the procedure of Example I but replacing 3-tert.-butyl-5-chlorosalicyclic acid with an equimolecular amount of 6-methyl-3-tert.butyl-5-chlorosalicyclic acid there is obtained 6-methyl-3-tert.butyl-2′,5-dichloro-4′-cyanosalicylanilide, M.P. 122.5–125° C.

Example V

Employing the procedure of Example I but replacing 3-tert.-butyl-5-chlorosalicyclic acid with an equimolecular amount of 3-tert.pentyl-5-chlorosalicyclic acid there is obtained 3-tert.pentyl-2′,5-dichloro-4′-cyanosalicylanilide, a solid.

Example VI

Employing the procedure of Example I but replacing 3-tert.butyl-5-chlorosalicyclic acid with an equimolecular amount of 3-methyl-5-chlorosalicyclic acid there is obtained 3-methyl-2′,5-dichloro-4′-cyanosalicylanilide, M.P. 235° C.

Illustrative of other 2′,5-dichloro-4′-cyanosalicylanilides of this invention are the following 3-ethyl-2′,5-dichloro-4′-cyanosalicylanilide,
3-isopropyl-2′,5-dichloro-4′-cyanosalicylanilide,
3-n-butyl-2′,5-dichloro-4′-cyanosalicylanilide,
6-methyl-3-sec.butyl-2′,5-dichloro-4′-cyanosalicylanilide,
6 - methyl - 3 - tert.pentyl - 2′,5 - dichloro - 4′ - cyanosalicylanilide,
3-n-hexyl-2′,5-dichloro-4′-cyanosalicylanilide, and the like.

In the process of this invention the methods by which the compounds of this invention are isolated will vary slightly with the reactants employed and the salicylanilide produced. Further purification by selective solvent extraction or by absorptive agents such as activated carbon or clays can precede the removal of the inert organic liquid (or solvent) when the latter is employed in the reaction system. Additionally an inert organic solvent can be added to the reaction product along with absorptive agents for purification purposes. However, the crude reaction product is generally satisfactory for pesticidal purposes without purification.

The 5-halosalicylic acid precursors are prepared in accordance with the well known procedure of preparing like materials by reacting in the presence of glacial acetic acid gaseous chlorine or liquid bromine with the appropriate salicyclic acid of the formula

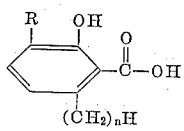

wherein $n$ and R have the aforedescribed significance, e.g. 3-isopropylsalicylic acid (M.P. 72–74° C.), 6-methyl-3-isopropylsalicylic acid, 3-tert.butylsalicylic acid (M.P. 158–160° C.), and 6-methyl-3-tert.butylsalicylic acid (M.P. 179–180° C.).

The compounds of this invention are particularly useful in destroying gastropods, that is the class of animal life Gastropoda within the phylum Mollusca, which cause considerable agricultural and horticultural damage, and particularly the snails of this class of animal life which are the necessary intermediate host or vector in the life cycle of various common parasites, as for example the trematodes or flukes which are parasitic in man and animals causing schistomiasis and like diseases.

As illustrative of the gastropodicidal properties of the compounds of this invention as compared to analogues and/or position isomers thereof, which respectively are prepared by the same process as that of the compounds of this invention employing the appropriate substituted aniline and the appropriate substituted salicylic acid in the presence of phosphorus trichloride, is the following:

*Evaluation I.*—Three snails (*Planobarius corneus* which is the species of snail host of the cyclocoelid *Tracheophilus sisowi*, the blood fluke *Bilharziella polonica* and several other trematodes) of 6 to 8 weeks of age are placed in a 200 x 32 mm. glass tube (two replicates each of said three snails) and thereto is added the compound to be evaluated in the form of an aqueous dispersion thereof having a concentration of 1.0 part per million, that is p.p.m. (This dispersion is prepared by dissolving and/or dispersing sufficient of the particular compound in 10 ml. of acetone to make a one percent by weight solution or mixture thereof and then adding sufficient water to give dispersions of the following tabulated concentration.) The percent kill (that is the average of two replicates of said three snails) at the end of 24 hours at room temperature for each of the following itemized compounds at a 1.0 part per million concentration was found to be as follows:

| Compound (melting point ° C.): | Percent kill at 1.0 p.p.m. |
|---|---|
| 2',5-dichloro-4'-cyanosalicylanilide | 100 |
| 3-methyl-2',5-dichloro-4'-cyanosalicylanilide | 100 |
| 3-tert.butyl-2',5-dichloro-4'-cyanosalicylanilide | 100 |
| 6-methyl-3-tert.butyl-2',5-dichloro-4'-cyanosalicylanilide | 100 |
| 3-tert.butyl-2',5,6'-trichloro-4'-cyanosalicylanilide (235–238) | 0 |
| 3 - tert.butyl - 2',4',5-trichloro-salicylanilide (158–160) | 0 |
| 3-tert.butyl-4',5-dichloro-2'-nitrosalicylanilide (159.5–160) | 30 |
| 3-tert.butyl-3',5-dichloro-4'-nitrosalicylanilide (207.5–208.5) | 0 |

In combatting the aquatic Gastropoda it is necessary to apply the gastropodicide to the waters or land areas adjacent thereto which form their habitats, and therefore to be practical the compounds of this invention must exhibit gastropodicidal activity at relatively high dilutions, for example $10^{-5}$ to $10^{-8}$ by weight.

In combatting the amphibious Gastropoda the compounds of this invention can be employed per se or formulated into a dust and dispersed or scattered on the ground along banks of streams, rivers, irrigation canals, or the edges of other bodies of water, e.g. the seashore, so that the amphibious Gastropoda will come in contact with the gastropodicidal agent when it leaves the water and begins to travel across ground areas.

Where the Gastropoda, whether aquatic or amphibious, sought to be combatted has a water habitat the compounds of this invention can be added per se to the water, or in the form of a formulated dust cast on the surface of the water, or sprayed on the water in the form of a solution thereof or a liquid emulsion formulation thereof.

Inert finely divided inert solid for the formulation of gastropodicidal dusts of this invention include fuller's earth, diatomaceous earth, bentonite, talc, pyrophillite, soybean flour, wood flour, and walnut shell flour, which dusts preferably have a particle size of 5 microns or below and contain from 5 to 95 percent by weight of a compound of this invention. Ordinarily such dusts will be applied at the rate of about 10 to 50 pounds of gastropodicidal agent per acre of surface area. These dusts based on the total weight thereof can also contain from 1 to 15 percent by weight of an anionic, cationic, or non-ionic surfactant or mixtures thereof to provide a "wettable" dust formulation. Liquid formulations can be prepared by dissolving the compounds of this invention in a suitable organic solvent such as acetone or butanone and sprayed as such or in admixture with a non-ionic or anionic surfactant or mixtures thereof to form a liquid emulsion formulation for spray purposes.

In all of the forms described above the formulations can be provided ready for use in combatting gastropods or they can be provided in a concentrated form suitable for mixing with or dispersing in other extending agents. As illustrative of a particularly useful concentrate is an intimate mixture of a compound of this invention with a water-soluble non-ionic or anionic surfactant or mixtures thereof which lowers the surface tension of water in the weight proportions of 0.1 to 15 parts of surfactant with sufficient of a compound of this invention to make 100 parts by weight. Such a concentrate is particularly adapted to be made into a spray for destroying various forms of gastropods by the addition of water thereto. As illustrative of such a concentrate is an intimate mixture of 50 parts by weight of 3-tert.butyl-2',5-dichloro-4'-cyanosalicylanilide and 2 to 4 parts by weight of a water-soluble non-ionic surfactant such as polyoxyethylene derivative of sorbitan monolaurate.

Another useful concentrate adapted to be made into a spray for combatting gastropods is a solution (preferably as concentrated as possible) of a compound of this invention in an organic solvent therefor, for example acetone, cyclohexanone or acetophenone. The said liquid concentrate preferably contains dissolved therein a minor amount (e.g. 0.5 to 10 percent by weight of the weight of the new gastropodicidal agent) of a non-ionic or anionic surfactant or mixtures thereof, which surfactant is also water soluble. Such a concentrate is a solution of 3-tert. butyl-2',5-dichloro-4'-cyanosalicylanilide in acetone which solution contains dissolved therein a water-soluble alkylarylsulfonate anionic surfactant, e.g. sodium dodecylbenzenesulfonate, or a water-soluble cationic surfactant of the $C_{12-22}$ fattyamine-ethyleneoxide condensate type.

Of the surfactants aforementioned in preparing the various emulsifiable, wettable or dispersible compositions or concentrates of this invention, the water-soluble anionic and non-ionic surfactants described in U.S. 2,846,398 are preferred. Of the anionic surfactants, the particularly preferred are the well-known water-soluble alkali metal alkylarylsulfonates as exemplified by sodium decylbenzenesulfonate and sodium dodecylbenzenesulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester of a higher fatty acid, e.g. oleic acid.

In all of the various dispersions described hereinbefore for gastropodicidal purposes, the active ingredient can be one or more of the compounds of this invention. The compounds of this invention can also be advantageously employed in combination with other pesticides, including, for example, nematocides, bactericides, and insecticides. In this manner it is possible to obtain mixtures which are effective against a wide variety of pests and other forms of noxious life.

The actual effective concentration of the compound of this invention for gastropodicidal purposes will depend upon the particular Gastropoda, weather conditions, and whether it is to be applied directly to the water which forms the habitat for the Gastropoda or to land areas which are crossed by amphibious Gastropoda either as the compound per se or in the form of formulations thereof. Those skilled in this art can readily determine the proper concentration for any particular application by knowing the particular dilution factor, which is generally expressed as the maximum aqueous dilution which will produce a 50% kill at a dilution of one part by weight per 8000 parts by weight of water (note—U.S. 2,-703,301 which issued Mar. 1, 1955).

As illustrative of several of the 5-chlorosalicylic acid precursors are 3-isopropyl-5-chlorosalicylic acid (M.P. 169–170° C.), 3-tert. butyl-5-chlorosalicylic acid (M.P. 220.222° C.), 6-methyl-3-tert. butyl-5-chlorosalicylic acid (M.P. 208–211° C.), 3-tert.pentyl-5-chlorosalicylic acid (M.P. 195–198° C.), 3-(1,1-dimethyl-n-butyl)-5-chlorosalicylic acid (M.P. 154.5–155° C.), 3-(1-ethyl-1-methyl-n-propyl)-5-chlorosalicylic acid (M.P. 152–154° C.) and 6-methyl-3-(1,1-dimethyl-n-butyl)-5-chlorosalicylic acid (M.P. 154.5–156° C.). The salicylic acid precursors for these 5-chlorosalicylic acids are either known materials or readily prepared by initially ortho-alkylating phenol or m-cresol with the appropriate olefin in accordance with the procedure of Stroh et al., Angew. Chem., vol. 69, pp. 699–706 (1957) to provide the substituted phenol

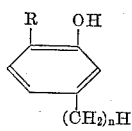

wherein R and $n$ have the afore-described significance (many of these substituted phenols are commercially available) and then carboxylating with carbon dioxide in the presence of aqueous sodium hydroxide in accordance with the Schmitt modification of the Kolbe synthesis (German Patent 29,939 and 38,742) and thereafter acidifying the sodium salt so produced. These salicylic acids are readily chlorinated in the 5-position thereof employing gaseous chlorine in the presence of glacial acetic acid.

While this invention has been described with respect to certain embodiments it is to be understood that it is not so limited and that variations and modifications thereof obvious to those skilled in the art can be made without departing from the spirit or scope of this invention.

The embodiments of the invention in which an exclusive property or privilege is claimed are defined as follows:

1. A 2′,5-dichloro-4′-cyanosalicylanilide of the formula

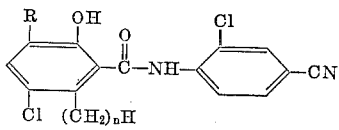

wherein $n$ is an integer from 0 to 1 and wherein R is selected from the group consisting of hydrogen and alkyl having from 1 to 5 carbon atoms.

2. A 2′,5-dichloro-4′-cyanosalicylanilide of claim 1 wherein $n$ is zero and wherein R is methyl.

3. A 2′,5-dichloro-4′-cyanosalicylanilide of claim 1 wherein $n$ is zero and wherein R is tert.butyl.

4. A 2′,5-dichloro-4′-cyanosalicylanilide of claim 1 wherein $n$ is one and wherein R is tert.butyl.

5. A 2′,5-dichloro-4′-cyanosalicylanilide of claim 1 wherein $n$ is zero and wherein R is hydrogen.

6. A method of destroying gastropods which comprises applying to gastropods and their habitat a gastropodically toxic amount of a 2′,5-dichloro-4′-cyanosalicylanilide of claim 1.

7. A method of destroying gastropods which comprises applying to gastropods and their habitat a gastropodically toxic amount of a 2′,5-dichloro-4′-cyanosalicylanilide of claim 1 wherein $n$ is zero and wherein R is tert.butyl.

8. A gastropodicidal concentrate adapted to be made into a sprayable composition upon mixing with water comprising on a weight basis 0.1 to 15 parts of a water-soluble surfactant and a sufficient amount of a 2′,5-dichloro-4′-cyanosalicylanilide of claim 1 to make 100 parts by weight, said water-soluble surfactant being selected from the group consisting of anionic and non-ionic surfactants.

9. A gastropodical concentrate comprising a 2′,5-dichloro-4′-cyanosalicylanilide of claim 2 and a finely divided inert solid, said concentrate containing from 5 to 95% by weight of said 2′,5-dichloro-4′-cyanosalicylanilide.

References Cited

UNITED STATES PATENTS 3,079,297  2/1963  Schraufstatter _____ 167—31

ALBERT T. MEYERS, *Primary Examiner.*

STANLEY J. FRIEDMAN, *Assistant Examiner.*